March 2, 1971  C. A. GASTON  3,567,319
ILLUMINATION SYSTEM
Filed Oct. 9, 1968  2 Sheets-Sheet 1
FIG. 1
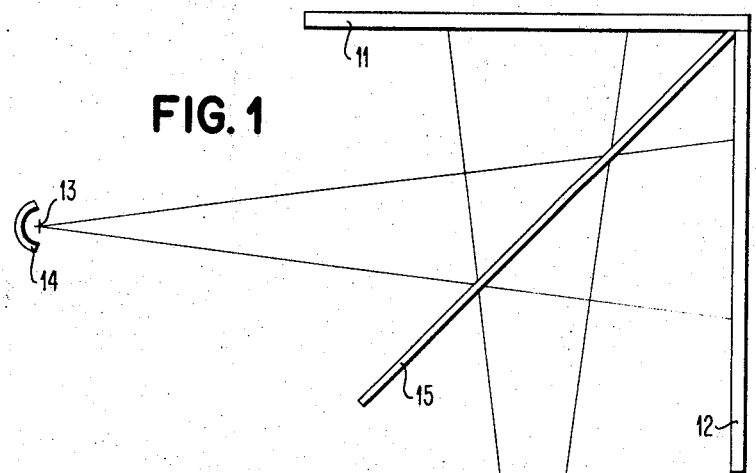
FIG. 3
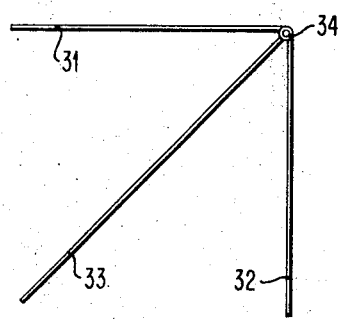
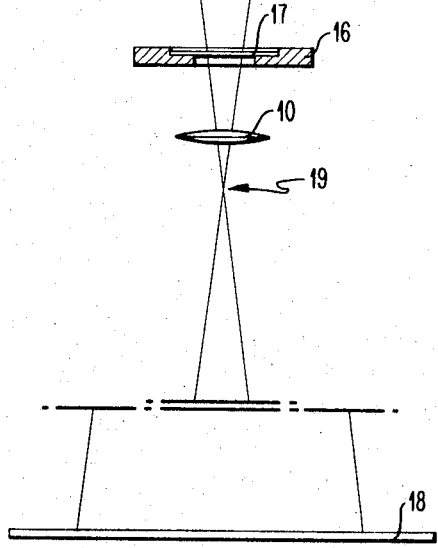
FIG. 4
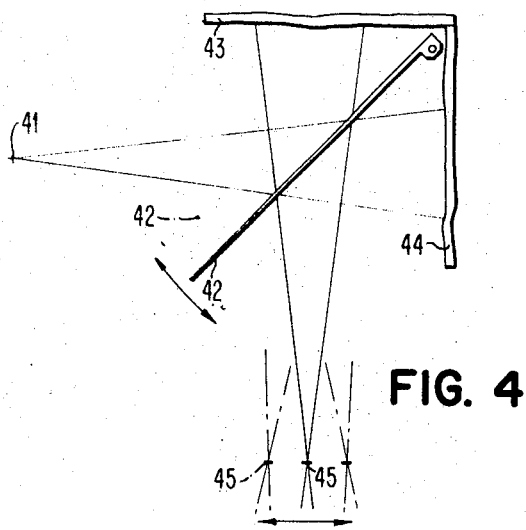
INVENTOR
CHARLES A. GASTON
BY Melvyn D. Silver
AGENT

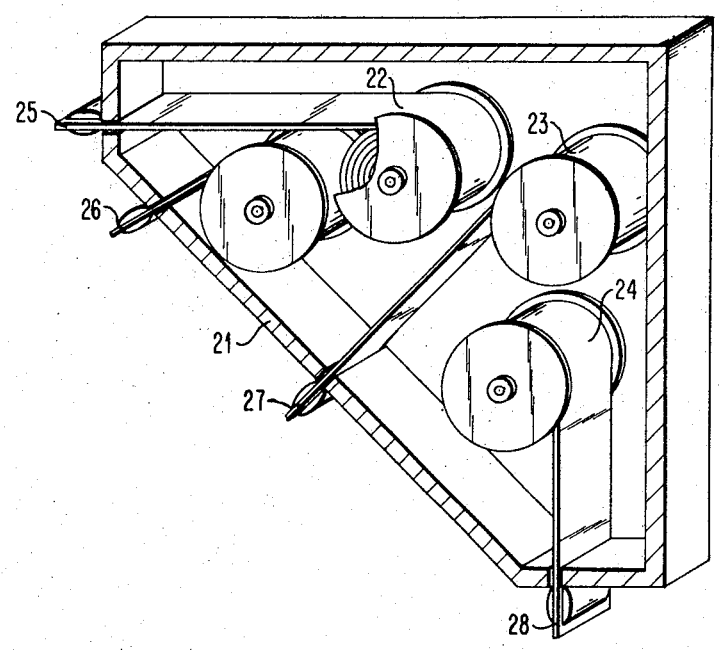
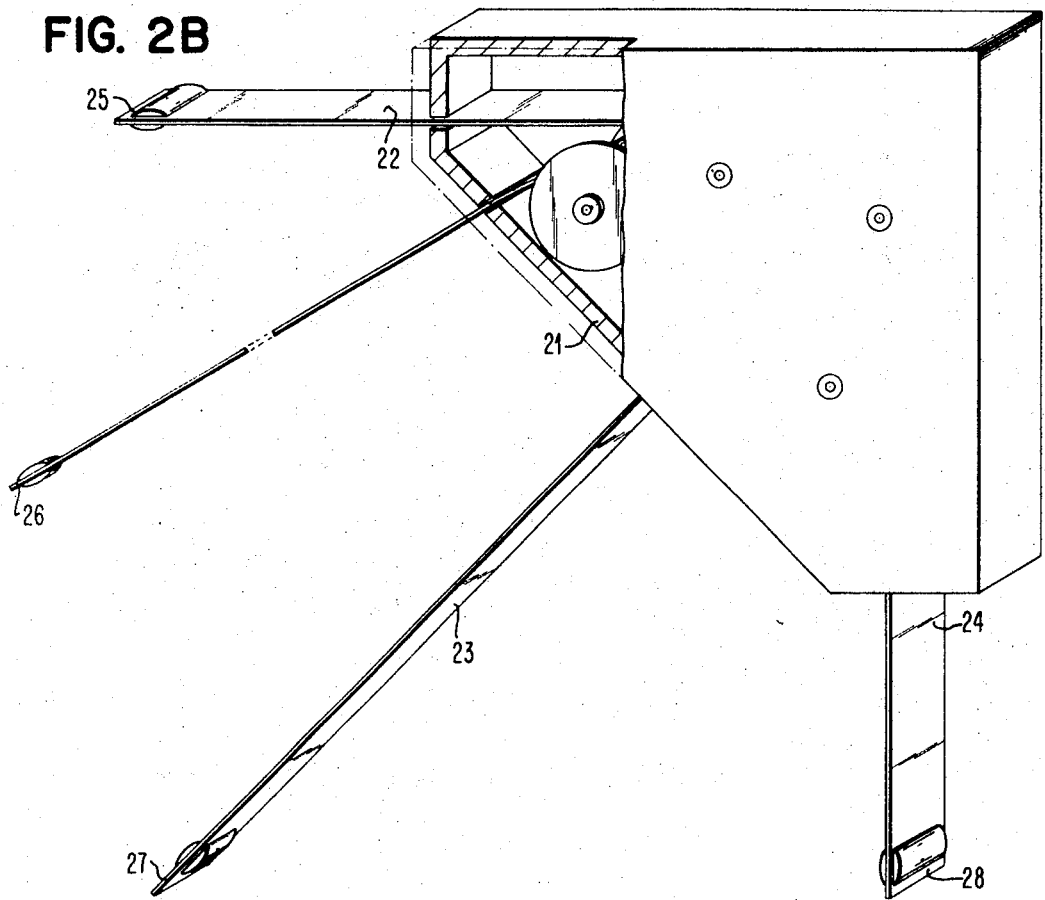

United States Patent Office 3,567,319
Patented Mar. 2, 1971

3,567,319
ILLUMINATION SYSTEM
Charles A. Gaston, Wheaton, Md., assignor to International Business Machines Corporation, Armonk, N.Y.
Filed Oct. 9, 1968, Ser. No. 766,221
Int. Cl. G03b *21/28*
U.S. Cl. 353—99                                      6 Claims

ABSTRACT OF THE DISCLOSURE

An illumination system for converting diverging light from a light source into converging light without the use of a lens, by utilizing a half-silvered mirror and two retroreflective surfaces.

FIELD OF THE INVENTION

Illuminating and projection systems employing a beam of diverging light which is converted via the elements comprising the system, into a beam of converging light, which may be utilized for illumination or image projection purposes.

BACKGROUND OF THE INVENTION

Illumination systems are well known. In one form, these systems are utilized for projecting images on a screen, as in the standard home movie projector, or slide projector. A photographic enlarger also may be considered as a projection system.

Such projection systems have certain inherent disabilities as known to date. These systems generally utilize a light source and a series of condensing lenses to take diverging light and convert it to converging light which is in turn passed through or about the object to be projected. These lens systems are generally expensive, and have a further disability that they must be accurately aligned and carefully handled. Most lenses being made of glass, cannot be considered as rugged, and are prone to the disadvantages inherent with glass systems. Further, since the glass lenses, which are themselves heavy, must be carefully aligned in relation to various apertures, and the light source, they are most often housed in a bulky metal or plastic framing. Thus, portability is appreciably reduced due to the weight and bulkiness of these systems. This bulk and alignment further adds to the cost of manufacturing such systems.

For the amateur photographer, who often must set up and take down his equipment whenever it is used, as opposed to having a permanent darkroom, this bulk and lack of ruggedness, and the high cost of photographic enlargers, is undesirable. Further, in showing slides, for exemple, where the slide projector must be set up and taken down each time it is used, the same bulk, cost, and weight associated with such units cause annoyances to the home user.

Further, when the home movie enthusiast wishes to use spotlights, he must often use bulky sealed beam units, which present the same problems as those above. The nature of the systems being as they are, the illumination system utilized in the photographic enlarger cannot be utilized in the slide projector, nor in the spotlight system.

OBJECTS OF THE INVENTION

It is an object of this invention to eliminate expensive lens systems for converting diverging light from a divergent light source into converging light, by utilizing inexpensive directionally reflective surfaces and inexpensive half-silvered mirrors.

Another object is to overcome alignment problems in lens systems by utilizing a system allowing wide tolerance variations in component placement.

Another object is to overcome focal point location problems in lens systems by a system allowing focal point adjustment by simple movement of a half-silvered mirror or the light source.

Still another object is to provide a projection system suitable for use in slide projectors and photographic enlargers that is rugged and inexpensive.

SUMMARY

These and other objects are met by the illumination system of this invention. This system is a lensless condensing system. In one embodiment, a source of diverging light is positioned to illuminate a half-silvered mirror, the source being positioned at a distance from the mirror equal to that distance from the mirror at which converging light focal point is desired. The half-silvered mirror is positioned to lie in the plane perpendicularly bisecting the line between the source and the desired focal point, and a directionally reflective surface is positioned to receive the light reflected from the source by the mirror. The directionally reflective surface, also known as a retroflector, may also be alternatively positioned to receive the light transmitted from the source to the half-silvered mirror. Alternately, two directionally reflective surfaces may be utilized in conjunction.

Thus, diverging light from the source strikes the mirror and divergingly strikes the reflective surfaces, from which it is reflectied back through the mirror in a converging beam. This beam may subsequently be used for illumination or projection purposes.

While one embodiment has been illustratively used, this invention will best be understood in conjunction with the following drawings and general description.

In the drawings:

FIG. 1 shows the basic optics of this system as used, for example, in a photographic enlarger.

FIG. 2 shows an embodiment of this system in the form of a collapsible, portable lensless condensing system.

FIG. 3 shows another embodiment in a hinged, foldable form.

FIG. 4 shows the flexibility of this system in achieving the focal point at a desired position.

DETAILED DESCRIPTION

The basic illuminating or lensless condensing system utilized may best be understood with reference to FIG. 1. FIG. 1 shows directionally reflective surfaces 11, 12, such as retro-reflectors, which return light in the direction from which it has come. These surfaces are made of a multiplicity of minute auto-collimating elements by which illumination incident upon them is redirected with the minimum dispersion back in the direction from which such illumination has come. As is well known, an auto-collimating element may take the form either of a catadioptic element, usually a sphere, having a forward lens surface for refracting incident radiation and a backward reflecting surface for returning the radiation through the lens surface; or a corner reflector having three mutually perpendicular reflecting faces which cooperate to return of the beam of incident radiation along its path of incidence. Both types of auto-collimating elements have been termed retro-reflectors, and a multitude of such retro-reflectors combined form a directionally reflecting surface. The system includes a light source 13, reflector 14, and half-silvered mirror 15.

In operation, light projected from a source 13 and reflector 14 is directed at half-silvered mirror 15 which lies in the plane perpendicularly bisecting the line between source 13 and focal point 19. Half the light will be reflected by the mirror onto directionally reflecting surface 11, and half the light will be transmitted through the mirror 15 onto directionally reflecting surface 12.

The directionally reflecting surfaces 11, 12, convert the initially diverging beams from a source 13 into converging beams returning toward the half-silvered mirror 15, by reflecting incident light back along its original path. Upon striking mirror 15 a second time, half of each beam would be transmitted by the mirror and half would be reflected. Thus, there are four possible light paths resulting from the double contact with the half-silvered mirror 15. Two of these four paths converge to a focal point 19. The other two return to the reflector 14.

Though it may appear that only half the light is used, the remaining half converges on the source, where reflector 14 starts the light back again on essentially the same path. The source 13-mirror 15 distance is equal to the mirror 15-focal point 19 distance, so that a desired focal point is easily obtained by initial placement of the source.

If the system in FIG. 1 is utilized as a photographic enlarger, it is necessary that some means 16 for holding an object plane 17 to be projected be supplied. This means 16 may be any standard slide holder, as is well known in the art. The term "object plane" is used to denote the object, the image of which it is desired to project upon a surface. This image may be projected upon a surface such as screen 18.

If desired, a lens 10 may be interposed between the object plane 17 and screen 18 to improve the sharpness of the image which will be projected. The lens 10 usually is placed at or near the focal point 19. Thus, this basic system has few parts, each of which is relatively inexpensive, and definitely so in comparison with lens systems.

Light source 13 should be as close to being a point source as possible. Such a source should be small, and have an intense light, such as a xenon, or mercury light source. A carbon arc source is desirable, although the disadvantage to the home user is the bulk involved with carbon arc systems. A tungsten filament in a clear envelope is also acceptable, as is an iodine vapor lamp, as is now used in home movie flood lamps. The desirability of a point source is shown by the facts that the resolution element of an image projected by a totally lensless system can be no smaller than the dimensions of the original light source, and that the diameter of the focusing lens 10 must be at least as great as the maximum dimension of the source if it is desired to capture all of the available light.

The purpose of reflector 14 is to reflect light coming back from the directionally reflective surfaces 11, 12. If a lens is used in conjunction with the image plane, the reflector should have an area smaller than that of the lens, or light leaving the edges of the reflector is not captured subsequently in the lens system. The reflector 4 is not an essential element to the system; however, it is desirable to increase efficiency. Directionally reflective surfaces 11 and 12 are shown used in conjunction with each other. However, it is clear that the system would be operative with either directionally reflective surface 11 or 12 used alone. The efficiency is clearly superior with both utilized.

The half-silvered mirror 15 is ideally half reflecting and half transmitting, and such mirrors are available and are known in the art. Other less ideal half-silvered mirrors may be utilized.

Materials for the directionally reflective screens 11 and 12 are well known in the art. There are metal reflective screens, bead screens and corner reflectors, all known in the art. While directionally reflective surfaces 11 and 12 are shown as straight-line rigid structures, it will become evident further on that such materials may be of plastic or other collapsible material. The advantage of a directionally reflective surface in this system, in addition to those advantages already noted, may be seen in conjunction with FIG. 4.

FIG. 4 shows the versatility of this system. Shown is light source 41, half-silvered mirror 42, and directionally reflective surfaces 43 and 44. In FIG. 4, it is desired to have a focal point at the point 45. Directionally reflective surfaces 43 and 44 need not be planar as shown in FIG. 1, because of the inherent nature of such a surface to return light along its incident path. Thus, surfaces 43 and 44 may be a flexible plastic or other flexible material having retro-reflecting elements thereon. It is further clear from FIG. 4 that adjustment of the position of the mirror will cause a change in the position of focal point 45 along a predictable path, which allows light scanning if desired. It is also clear from FIGS. 1 and 4 that varying the distance of the light source from the half-silvered mirror will vary the distance of the focal point from the mirror. Thus, focal point may be varied easily by movement of the light source. If it is desired to utilize the lens, as discussed in conjunction with FIG. 1, focus adjustment may easily be obtained by coupling the light and lens source, so that if one is moved, the other is similarly moved. Then, the lens remains at the point of minimum beam diameter and need not be oversized to accommodate focal adjustment.

FIG. 2 shows another embodiment of this invention as a portable illumination system. In FIG. 2a is shown, in top view, a collapsible lenless condenser having a support stand 21 having rolled elements 22, 23, and 24 thereon. Element 22 and 24 are collapsible fabric base, or plastic base, or other flexible base screens having retroreflective surfaces thereon. Roller element 23 is a flexible base half-silvered mirror. Extenders 25, 26, 27 and 28 are also attached to the unit. In FIG. 2b, extenders 25, 26, 27, and of the nature of spring-loaded extenders, for example are shown partially extended. Screens 22 and 24 are unrolled and maintained in position by extenders 25 and 28 respectively. Half-silvered mirror 23 is extended and maintained in place by extender 27. Extender 26, an optional convenience, is used to locate the central position for a light source relative to the half-silvered mirror 23. Once located, extender 26 may be retracted or collapsed back into housing frame 21. A choice of light source is available, as previously discussed, and thus easily properly positioned. The diverging light from the light source will strike half-silvered mirror 23, with the same optical effects as described in conjunction with FIG. 1. When no longer needed, the system is collapsed as shown in FIG. 2a. Such a system may be very small or very large in physical size, depending upon the light source and area desired to be illuminated. In any event, the system is collapsible and takes up a minimum amount of space, and is of minimum weight, relative to comparable glass lens systems. In lieu of the spring-loaded extenders shown, antenna-type extenders may be used, with the collapsible screens being hooked to the ends of the extenders.

FIG. 3 shows a collapsible lensless condensing system which is a variation of the embodiment of FIG. 2. Directionally reflective surfaces 31 and 32 are shown as rigid structures in conjunction with the half-silvered mirror 33. The directionally reflective surfaces 31 and 32 and half-silvered mirror 33 are connected to a hinge structure 34, which allows the system to be collapsed, as a book, when not in use and readily opened for use in conjunction with the light source, as in FIG. 2. Tolerances are no problem, as due to the nature of the directionally reflective surfaces, as discussed previously, there is no true critical alignment for the positioning of the directionally reflective surfaces.

Thus, the system described has the advantages of being extremely rugged, light in weight, and utilizes few elements in the make-up of the system. It is thus inexpensive, and may be often set up and taken down by the amateur photographer with little difficulty. As improved materials are brought into the market, individual items may be readily replaced without the problems associated with attempting to substitute carefully calculated lenses in a rigidly mounted lens system with other lenses.

Thus, in sum, a converging light system from a diverging light source has been disclosed that utilizes inexpensive directionally reflective surfaces and inexpensive half-silvered mirrors, eliminating expensive lens systems that achieve the same object. Aligning problems normally associated with lens systems are eliminated in this system which allows wide tolerance variation in component placement. Focus adjustment of the disclosed system is easy and readily done. The illumination system disclosed, while disclosed for a photographic enlarger, is readily adaptable to slide projectors, or to general illumination systems. These systems in common have the advantage of ruggedness and low cost, even in sizes too large to be practical for conventional lens systems.

While particular light sources have been disclosed, and particular components, it is understood that those skilled in the art will readily be able to substitute other materials for those disclosed while still utilizing the advantages of this system.

While the invention has been particularly shown and described with reference to preferred embodiments thereof, it will be understood by those skilled in the art that various changes in form and details may be made therein without departing from the spirit and scope of the invention.

What is claimed is:

1. A lensless condensing system for converting diverging light from a light source into converging light comprising a divergent light source positioned to illuminate a half-silvered mirror, said source positioned at a distance from said mirror equal to that distance from said half-silvered mirror at which a converging light focal point is desired, said half-silvered mirror positioned to lie in a plane perpendicularly bisecting the line between said source and the desired focal point; a retro-reflective surface positioned to receive the light reflected from said source by said half-silvered mirror; and retro-reflective surface positioned to receive the light transmitted from said source through said half-silvered mirror.

2. A condensing system as in claim 1 wherein said retro-reflectors and said mirror are rigid structures and further comprising a hinge structure joining a side edge of each of said half-silvered mirror and said retro-reflective surfaces, thereby allowing adjacent surfaces of said mirror and retro-reflectors to be collapsed, as a book, when the system is not in use.

3. A condensing system as in claim 1 further comprising a reflective element on the side of the light source opposite the retro-reflective surface positioned to receive the light transmitted from the source, whereby the light-gathering efficiency of the system is increased.

4. A projection system comprising a divergent light source for emitting a beam of light and positioned to illuminate a half-silvered mirror, said source positioned at a distance from said mirror equal to that distance from said half-silvered mirror at which a converging light focal point is desired, said half-silvered mirror positioned to lie in a plane perpendicularly bisecting the line between said source and the desired focal point; a retro-reflective surface positioned to receive the light beam reflected from said source by said half-silvered mirror; and a retro-reflective surface positioned to receive the light beam transmitted from said source through said half-silvered mirror; and means for holding an object plane within the beam of light within said system and between said light source and a surface so as to enable projection of an image of said object plane upon the surface.

5. The system of claim 4 wherein said object plane is positioned between said half-silvered mirror and a surface upon which an image of said object plane is to be projected.

6. The systems of claim 1 or 4 including means for adjusting the position of said light source relative to said half-silvered mirror so as to allow the focal point of the converging beam of light to be varied along a predictable path.

References Cited

UNITED STATES PATENTS 3,331,688    7/1967    Altman _____ 96—27

OTHER REFERENCES

Burckhardt et al.: Formation and Inversion of Pseudoscopic Images, Applied Optics, vol. 7, No. 3, April 1968, pp. 622–631.

LEONARD FORMAN, Primary Examiner

S. L. STEPHAN, Assistant Examiner

U.S. Cl. X.R.

240—41.35; 350—294; 353—102